Dec. 9, 1969  M. E. WEBSTER  3,482,784

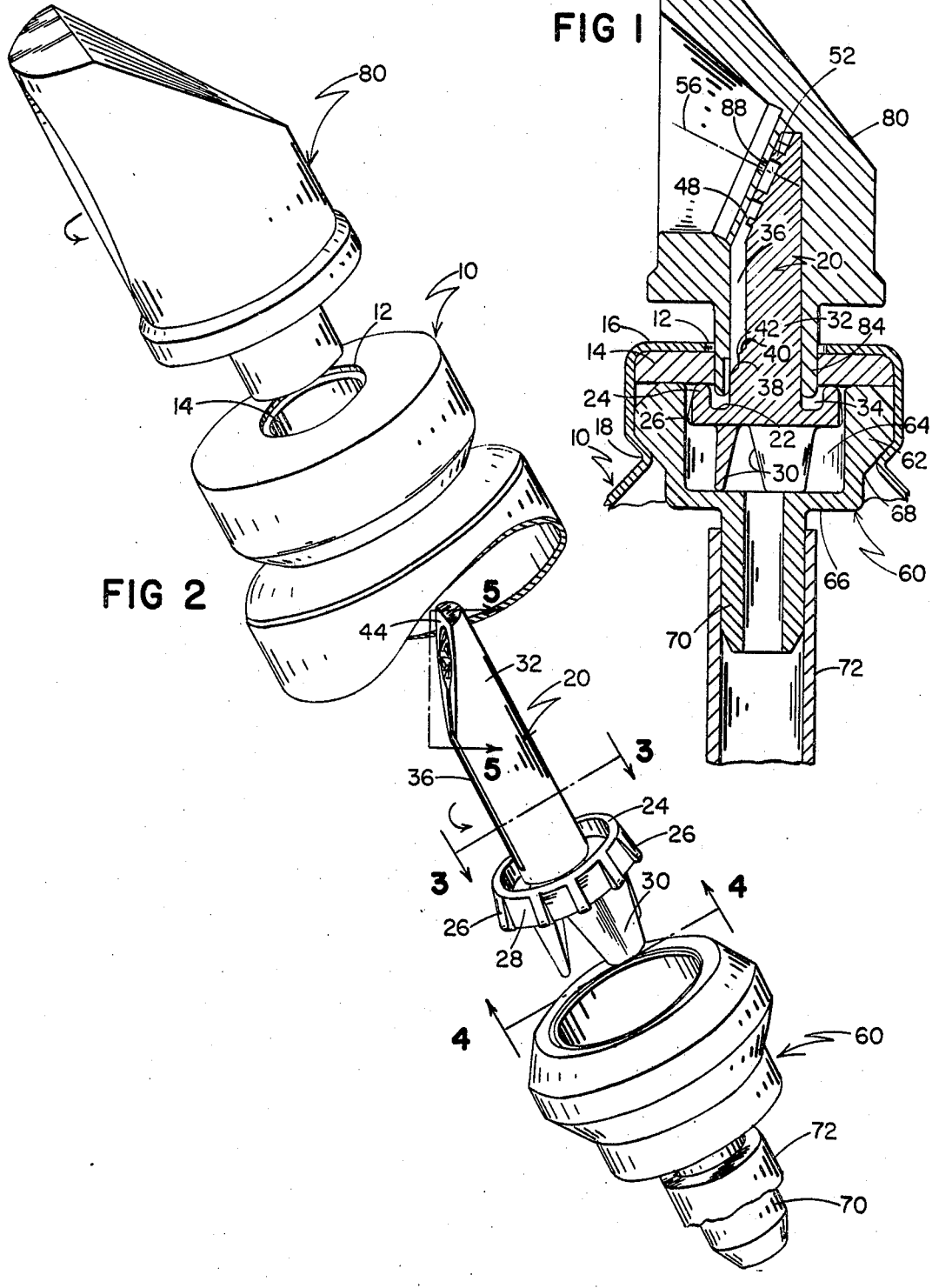

VALVE

Filed Oct. 11, 1967  3 Sheets-Sheet 2

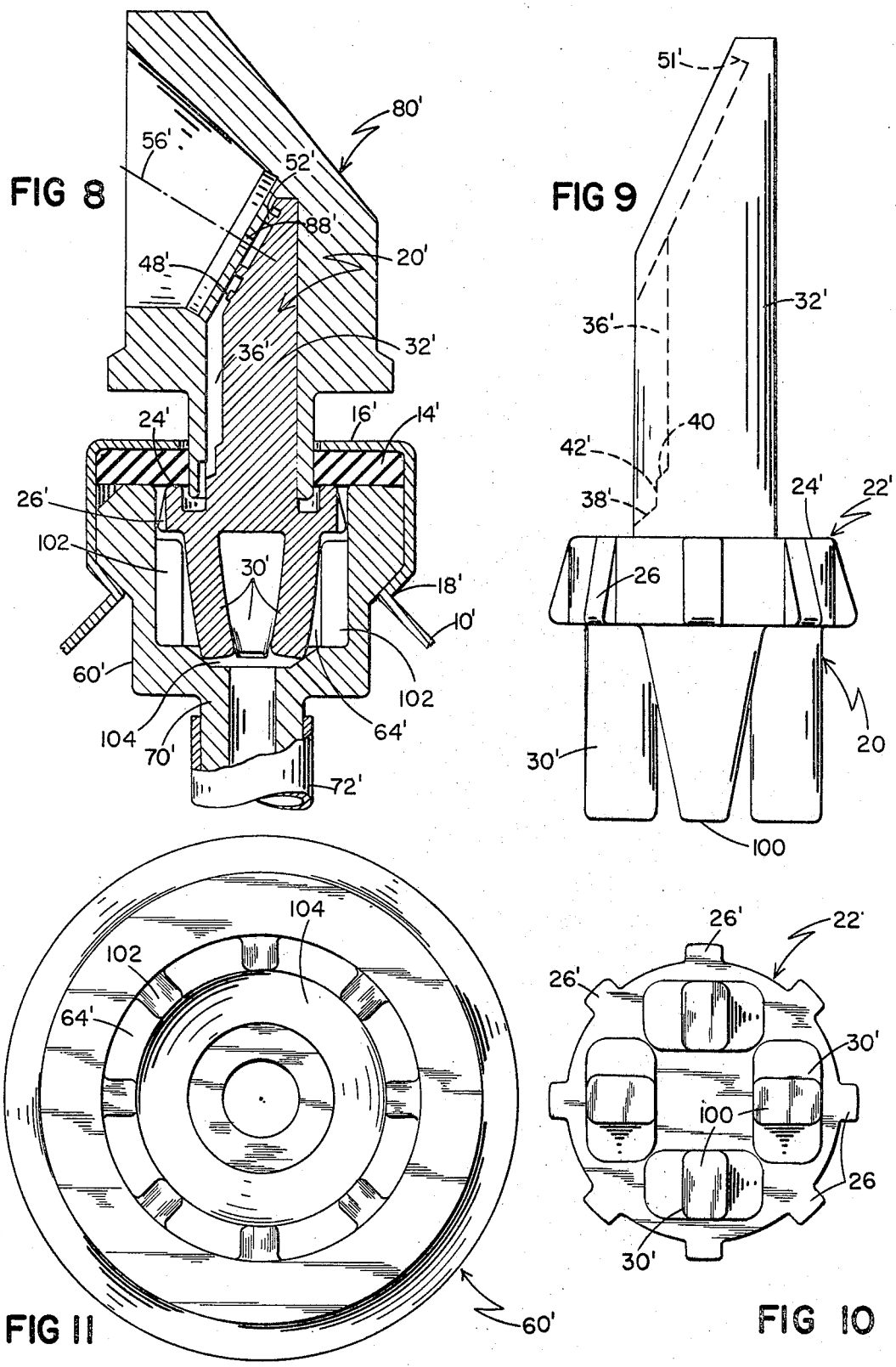

United States Patent Office 3,482,784
Patented Dec. 9, 1969

3,482,784
VALVE
Milo Edward Webster, Braintree, Mass., assignor to The Gillette Company, Boston, Mass., a corporation of Delaware
Filed Oct. 11, 1967, Ser. No. 674,594
Int. Cl. B05b 1/34, 1/30
U.S. Cl. 239—493          33 Claims

ABSTRACT OF THE DISCLOSURE

A three-piece valve assembly, for a pressurized container, includes a valve stem having a swirl groove in an inclined surface at one end thereof, and an axial groove extending from the other end thereof to said swirl groove. The axial groove has a stepped entry at said other end. The stem also includes a base that has an annular valving ridge about said stem and three diverging legs on the opposite side of the base from the valving ridge. A cooperating housing provides a bearing surface in biasing contact with the legs to urge the valving ridge into sealing engagement with a valving surface of the container, and a cooperating cap, disposed on the stem, has a discharge aperture which overlies the swirl groove and a short grooved fluid passage extending from the end of the cap adjacent the base to the entry of the axial valve stem groove.

SUMMARY OF INVENTION

This invention relates to valve assemblies and more particularly to improved valve assemblies particularly adapted for use with pressurized material dispensing containers.

Valve assemblies for pressurized material dispensing containers have a number of desiderata. The number of components of the assembly should be minimized to facilitate rapid and inexpensive manufacture and assembly. Metal components should be eliminated where possible, both as an adjunct to the object of minimizing the number of components, and also to eliminate the possibility of metal corrosion and/or product contamination. Further, the components advantageously should be capable of being formed by simple molding processes to minimize cost, particularly where functional structures are required at angles to major axes. The valve assembly should also include provision for breakup of solids and proper mixing of components of the material during the dispensing operation.

It is a principal object of the invention to provide an improved valve assembly of simplified construction. Another object of the invention is to provide an all plastic, self-closing, aerosol valve assembly. Another object of the invention is to provide a novel and improved valve assembly which eliminates the necessity of a metal spring component. Still another object of the invention is to provide a novel and improved valve assembly in which the manufacture of components is simplified. Still another object of the invention is to provide a valve assembly which provides improved mixing and dispersion (break up) of the dispensed materialy. A specific object of the invention is to reduce the number of components required in a particular type of aerosol valve assembly.

In accordance with the invention there is provided a valve assembly for a pressurized material dispensing container that includes a valve housing for mounting in the container, a valve member disposed in the valve housing and a cap member supported on the valve member outside of the container. The valve housing defines a valve chamber having an inlet port for communication with the interior of the container and an outlet port. A valve surface is provided in the housing adjacent the outlet port and a base in the housing is positioned in and axially spaced from the valve surface. The valve member has a body portion on one side of which is formed a valving surface for engaging the housing valve surface to seal the outlet port of the housing, an elongated axially extending stem located coaxially with respect to the valve surface and extending through the outlet port, and a plurality of resilient legs extending in the opposite direction from the valve surface for cooperating with the base surface of the housing to bias the valve member into sealing engagement with the valve surface of the housing. The cap is disposed on the stem of the valve member and cooperates with that stem to define a dispensing passage for material discharged through the outlet port, and includes a wall member having a surface cooperating with the end of the stem to define a dispensing chamber in communication with the dispensing passage, and a discharge orifice extending through that wall member for discharging the material externally of the valve assembly in a dispensing operation.

In particular embodiments of the invention, the cooperating surface of the cap is angularly disposed with respect to the longitudinal axis of the stem and mates with a similar angularly disposed surface of the stem to define the mixing chamber. Further, channels are provided in the stem mating surface, which channels produce swirling movement in the dispensing chamber of material from the discharge passage. Also the discharge passage is defined by a groove that extends longitudinally along the exterior wall of the stem and that groove includes a portion of reduced cross-sectional area for creating velocity differentials in the material flowing through the discharge passage. In a particular embodiment, a first portion of reduced cross-sectional area is provided by a stepped entry section at the end of the groove adjacent the valve member body portion; and a second portion of reduced cross-sectional area is provided by a rib that extends across the width of the groove immediately adjacent the dispensing chamber. Construction of the stepped entry configuration is facilitated by the provision of an auxiliary axially extending groove in the bore of the cap at the portion overlying the stepped entry formed in the stem. Also, in a particular embodiment the resilient valve biasing legs are symmetrically spaced around the axis of the valve member and are inclined outwardly with respect to that axis. These legs are tapered and cooperate with the base surface of the housing to provide a firm and positive seal of the outlet port without the use of any metal biasing component.

Valve assemblies constructed in accordance with the invention are inexpensive to manufacture as the design facilitates simplified molding operation, and only three components are required. In specific embodiments improved break up and mixing of the dispensed material is provided through the provision of velocity differentials in the flow passages and a swirling action in a dispensing chamber immediately adjacent the discharge orifice.

Other objects, features and advantages of this invention will be apparent to those skilled in the art from the following detailed description of particular embodiments thereof together with the accompanying drawings, in which:

FIG. 1 is an elevation in section of a valve assembly embodying the invention;

FIG. 2 is an isometric exploded view of the valve assembly illustrated in FIG. 1;

FIG. 8 is an elevation in section of a second form of valve assembly embodying the invention;

FIG. 9 is an elevation of the valve stem employed in the assembly shown in FIG. 8;

FIG. 10 is a bottom view of the valve stem shown in FIG. 9; and

FIG. 11 is a top view of the valve housing employed in the assembly shown in FIG. 8.

DESCRIPTION OF PARTICULAR EMBODIMENTS

Figure 3:
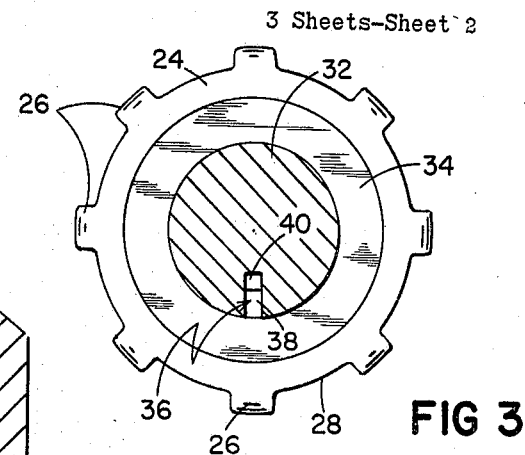
FIG. 3 is a sectional view through the valve stem of the valve assembly taken along the line 3—3 of FIG. 2.

With reference now to the drawings and more particularly with reference to FIGS. 1 and 2 thereof, a pressurized material dispensing container 10 has a circular aperture 12 therein through wall 16 and an elastomeric annular gasket seal 14 positioned against, and extending entirely across, the inner surface of wall 16 about the aperture 12, annular seal 14 being coaxial with aperture 12 and having a 0.150 inch aperture slightly smaller than the inner diameter of aperture 12.

The valve assembly for the container includes a valve stem 20 and cooperating valve housing 60 and cap 80.

Figure 4:
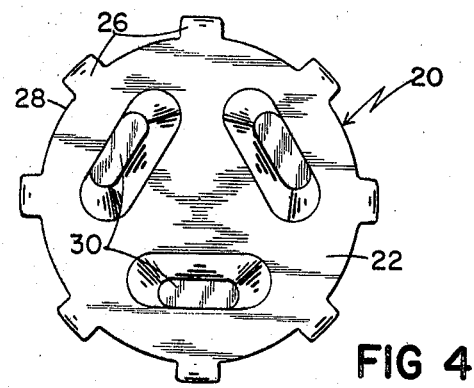
FIG. 4 is a bottom view of the valve stem generally along the line 4—4 of FIG. 2.

Valve stem 20 includes a base or body portion 22 transversely extending within container 10 across aperture 12. A continuous annular valving surface in the form of ridge 24, coaxial with aperture 12, extends from base 22, at its periphery, toward seal 14, under wall 16, for sealing engagement with the seal 14. A plurality of axially extending spacing and guide ribs 26 are provided on the outer circumferential wall 28 of base 22. Depending from base 22, spaced apart and extending generally axially away from the seal 14 are three thin, resilient legs 30 (that taper in thickness from 0.038 inch adjacent base 22 to 0.020 inch at their ends and in width from 0.107 inch adjacent base 22 to 0.060 inch at their ends). The inner walls of legs 30 are divergent, the outer walls extend at right angles, as shown in FIG. 4 to the plane of rib 24, and the legs 30 are symmetrically disposed about the axis of valve stem 20.

Valve stem 20 also includes a generally cylindrical stem portion 32, coaxial of base 22 and aperture 12, of 0.126 inch diameter and spaced from ridge 24 to define an annular groove or flow passage 34 therebetween. Stem portion 32 extends longitudinally axially from base 22 through aperture 12 and terminates at an end remote from container 10. An axially extending narrow groove 36, 0.010 inch wide and 0.030 inch deep, is formed in the side of the stem portion 32. As shown in FIG. 1, groove 36 commences at a position, within container 10, slightly above the plane of sealing rib 24 and adjacent seal 14, and has a stepped entry construction thereat formed by a pair of walls 38, 40 in groove 36, each inclined at 45° angles inwardly from the outer wall of stem portion 32, walls 38, 40 being connected by an axially extending wall segment 42 in groove 36, 0.020 inch from the outer surface of stem portion 32 and of 0.020 inch in length.

Figure 5:
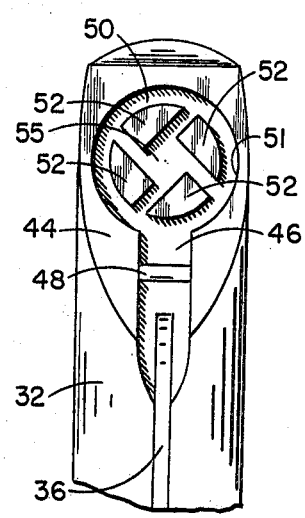
FIG. 5 is a view of the swirl grooving at the top of the valve stem generally along the line 5—5 of FIG. 2.

The end of stem portion 32 is inclined at a 25° angle with respect to the axis of groove 36. As is best shown in FIGS. 2 and 5, a flat surface 44 is thereby provided at the end of stem portion 32. A groove 46 of 0.040 inch width and 0.020 depth in surface 44 extends from groove 36 to a discharge chamber 50 defined by circular wall 51. A transverse rib 48, 0.010 inch in height extends across groove 46 between groove 36 and chamber 50. Four projections or islands 52 are provided within chamber 50 and extend to a level flush with surface 44. In plan, as shown in FIG. 5 the projections 52 define with wall 51 an annular groove, and between them tangential grooves that extend inwardly from the annular groove to a swirl chamber 55 (0.035 inch by 0.035 inch) coaxial of discharge chamber 50 discharge axis 56.

The valve stem 20 is molded of plastic material which is resilient in thin sections but otherwise is relatively rigid. In the described embodiment an acetal resin such as that sold under the trademark "Delrin" is used. Valve housing 60 is also made of such material.

Valve housing 60, best shown in FIGS. 1 and 2, has an annular wall portion 62, which is held in sealing contact with seal 14 by a crimp 18 in the wall of container 10 which engages a recessed portion 68 of wall 62, and an integral transverse wall portion 66, spaced from seal 14, defining a central cavity 64 housing the body portion 22 of valve stem 20. The 0.278 inch inner diameter of cavity 64 is slightly greater than the maximum diameter of base 22 at ribs 26. Transverse wall 66 extends below and supports the lower ends of legs 30 remote from seal 14. The distance between seal 14 and the side of transverse wall 66 facing seal 14 is 0.010 inch less than the 0.190 inch distance between the most remote portions of rib 24 and legs 30. An integral tubular portion 70 of housing 60, positioned coaxially of cavity 64 in wall 66, extends from wall 66 away from cavity 64 and provides communication with the rest of the interior of container 10. If desired a dip tube 72 may be connected to the tubular portion 70.

Figure 6:
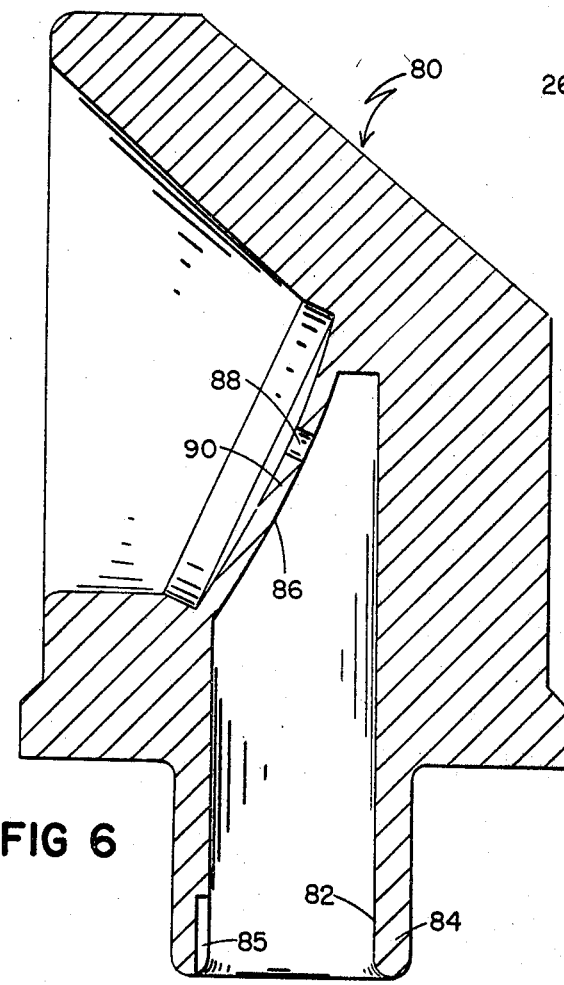
FIG. 6 is a sectional view of the cap of the valve assembly.
Figure 7:
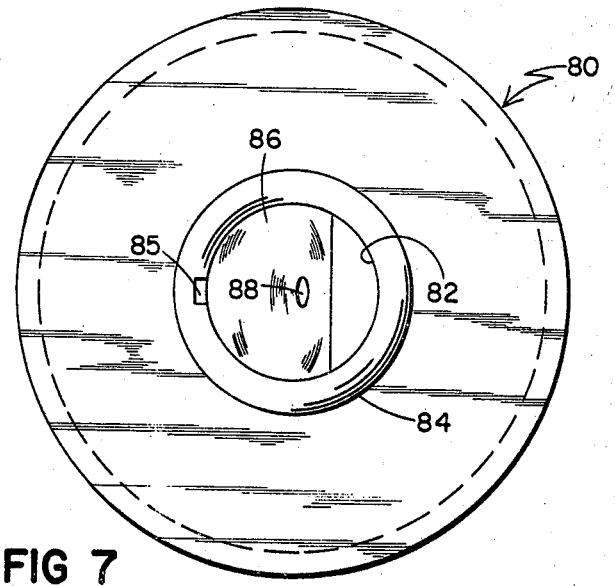
FIG. 7 is a bottom view of the cap.

As best shown in FIGS. 1 and 6, cap 80, molded of medium density polyethylene, has an internal bore or cavity 82, 0.126 inch in diameter, conforming to the exterior configuration of stem 32. Extension portion 84 of cap 80 extends through aperture 12 in sliding, sealing contact with seal 14 and terminates between the end of groove 36 at wall 38, and groove 34. A groove 85, 0.030 inch in width and 0.010 inch in depth is formed on the interior of extension 84, is aligned with groove 36, and overlies wall 42. Bore 82 is cylindrical and has a diameter equal to that of stem 32 for a tight slip fit thereon. At the end of stem 32, surface 86 is inclined 25°, is bowed slightly inwardly (a radius of 0.825 inch) and seats flush against surface 44 and projections 52 to form one wall of the discharge and swirl chamber. A small discharge aperture 88, 0.013 inch in diameter, as shown in FIGS. 1 and 7 is provided in a thin disc like bowed wall portion 90, of which surface 86 is the interior surface, of cap 80, discharge aperture 88 being coaxial with the discharge chamber 55.

Although there is a great deal of detail to the design of this valve assembly it will be appreciated that its three components can be manufactured by simple molding techniques and requires a minimum of assembly labor and expense. When assembled, the valve stem 20 is pre-biased against seal 14, for self-closure, by the conjoint pressure exerted by wall 66 of housing 60 and legs 30 which are resilient due to the thin cross-section thereof and the nature of the material of which the valve stem 20 is constructed.

In operation, when cap 80 is depressed, because of the mating of surfaces 44 and 86, transmits force against valve stem 20, spreading the diverging legs 30, and moving rib 24 away from seal 14. In this position of the valve assembly pressurized material passes from the container, through dip tube 72 and tubular portion 70 to cavity 64 of housing 60. From housing 60 the material passes between the spaced apart legs 30, past ribs 26, over rib 24, and through grooves 34, 85, 36, and 46. The restricted opening provided by groove 85 together with the stepped entry to groove 36 provided by walls 38, 40 and 42, assists in the break up of solids, if any, in the fluid and causes tubulence for better mixing; transverse rib 48 in groove 46 serves the same function. From groove 46 the material passes into the swirl and discharge chambers and ultimately exits through aperture 88 on discharge axis 56. When the cap 80 is released, the biasing force of legs 30 against wall 66 moves sealing rib 24 against seal 14 to close the valve.

A second embodiment of the invention is shown in FIGS. 8–11. In these figures, components that are similar or identical to the structure shown in FIGS. 1–7 are identified with a primed reference numeral. Thus, cap 80' and the upper portion of valve stem 32' are identical in configuration with that shown in FIGS. 1–7. The valve stem 32' includes an axially extending passage 36' having stepped entrance surfaces 38', 40' and 42' and its lower end and a discharge and swirl chamber structure defined by surface 51' among others at its upper end.

The valve stem 32' includes a base 22' (0.075 inch in height) which has a continuous annular valving surface in the form of rib 24' on its upper surface, a plurality of spacing ribs 26' on its side wall, and from which depend four resilient legs 30'. Each leg 30' extends parallel to the axis of the stem a distance of 0.170 inch, is of uniform thickness (0.060 inch), and tapers in width from a dimension of 0.107 inch at its upper end (at base 22') to a width of 0.040 inch at tip 100.

Valve housing 60' secures resilient annular seal 14' against upper wall 16' by a crimp 18' in the wall of container 10'. Cavity 64', 0.278 inch in inner diameter, has a series of ribs 102 spaced around its periphery, each of which terminates 0.085 inch from the top of housing 60' and provide a limit or stop for base 22'. At the bottom of cavity 64' is inclined conical wall 104 that tapers at an angle of 45° to the axis of housing 60'. The depth of cavity 64' at the base of wall 104 is 0.270 inch. Extending from the base of housing 60' is a tubular extension 70' to which a dip tube 72' may be connected.

The valve stem 20' and housing 60' are molded to phenylene oxide such as that sold under the trademark "Noryl." When the components are assembled as indicated in FIG. 8, the four legs 30' are bowed slightly inwardly under the influence of conical surface 104 to produce a biasing force which urges ridge 24' into firm sealing engagement with gasket 14'. Depression of cap 80' moves stem 20' downwardly forcing the legs 30' along surface 104 until the bottom of base 22' seats on ribs 102. In that position the passage between gasket 14' and rib 24' is open and pressurized material passes from the container 10' through the series of passageways into the swirl and discharge chambers and ultimately exits through aperture 88' on discharge axis 56'. When cap 80' is released, the biasing force of legs 30' moves sealing rib 24' against seal 14' to close the valve.

While particular embodiments of the invention have been shown and described, various modifications thereof will be obvious to those skilled in the art and therefore it is not intended that the invention be limited to the disclosed embodiments or to details thereof.

What is claimed is:

1. A valve assembly for a pressurized material dispensing container comprising:
   a valve housing for mounting in said container, said housing defining a valve chamber having an inlet port for communication with the interior of said container and an outlet port, a valve surface in said housing adjacent said outlet port, a base surface in said housing axially spaced from said valve surface;
   a valve member disposed in said valve housing, said valve member having a body portion, a valving surface on one side of said body portion for engaging said housing valve surface and sealing the outlet port of said housing, an elongated, axially extending stem located coaxially with respect to said valving surface and extending through said outlet port, and a plurality of resilient legs extending in the opposite direction from valving surface for positioning on said base surface of said housing and biasing said valving surface into sealing engagement with said housing valve surface;
   a cap disposed on said stem, said cap having a bore adapted to receive said stem and cooperate therewith to define a dispensing passage for material discharged from said container under pressure, and a wall member including a surface cooperating with the end of said stem to define a dispensing chamber in communication with said dispensing passage, and a discharge orifice extending through said wall member from said dispensing chamber.

2. The valve assembly as claimed in claim 1 wherein said cooperating surface of said cap is angularly disposed with respect to the longitudinal axis of said stem and mates with an angularly disposed surface of said stem, and further including channels in said stem mating surface for producing swirling movement in said dispensing chamber of material from said discharge passage.

3. The valve assembly as claimed in claim 1 wherein said discharge passage defines a groove extending longitudinally along the exterior wall of said stem to said dispensing chamber.

4. The valve assembly as claimed in claim 3 wherein said discharge passage defining groove includes a portion of reduced cross-sectional area for creating velocity differentials in the material flowing through said discharge passage.

5. The valve assembly as claimed in claim 4 wherein said reduced cross-sectional area of said groove is a stepped entry at the end of said groove adjacent said valve member body portion.

6. The valve assembly as claimed in claim 5 and further including an auxiliary axially extending groove in the bore of said cap overlying said stepped entry and defining the entrance of said discharge passage.

7. The valve assembly as claimed in claim 1 wherein said resilient legs are symmetrically spaced around and are inclined outwardly with respect to the axis of said valve member.

8. The valve assembly as claimed in claim 7 wherein said housing base surface is a planar surface disposed parallel to said valve surface.

9. The valve assembly as claimed in claim 1 wherein said resilient legs are symmetrically spaced around the axis of said valve member and said valve housing base surface is inclined with respect to the axis of said valve assembly.

10. In a valve stem for a pressurized material dispensing container adapted for coaction with a cap to mix and to discharge said material on a discharge axis angularly disposed to the longitudinal axis of said stem, said valve stem having a valving surface integral therewith, that improvement comprising:
   an end surface on said stem normal to said discharge axis; and
   swirl chamber structure formed in said end surface, said swirl chamber structure adapted to cooperate with an interior wall surface of a cap received on said stem to define a swirl chamber for break up of the dispensed material.

11. The improvement claimed in claim 10 in which said swirl chamber structure is formed of grooves in said surface defining a plurality of islands flush with said surface, a first flow passage groove extends longitudinally along the exterior wall of said stem to said surface and a second flow passage groove extends along said surface from said first flow passage to said swirl chamber.

12. The improvement claimed in claim 10 further including in combination with said valve stem a cap thereon having an interior wall flush with said surface and further having an aperture through said wall coaxially of said discharge axis.

13. In a valve stem for a pressurized material dispensing container adapted for coaction with a cap to mix and to discharge said material on a discharge axis angularly disposed to the longitudinal axis of said stem, that improvement comprising:
- a surface on said stem normal to said discharge axis;
- a swirl chamber formed in said surface coaxially of said discharge axis;
- said cap having an interior wall adapted to engage said stem surface and having an aperture through said wall coaxially of said discharge axis, said interior wall of said cap being bowed inwardly and distorted by engagement with said stem surface to planar configuration when said cap is placed on said stem.

14. The improvement claimed in claim 13 in which a first flow passage extends longitudinally along the exterior wall of said stem to said surface and a second flow passage extends along said surface from said first flow passage to said swirl chamber.

15. The improvement claimed in claim 14 in which said flow passages are grooves on said wall and said surface.

16. The improvement claimed in claim 15 in which said interior wall is additionally flush with the exterior wall of said stem and extends transversely across said grooves defining, together with said grooves, said swirl chamber and said flow passages.

17. The improvement claimed in claim 16 in which said groove forming said first flow passage has a stepped entry at its end opposite said surface.

18. The improvement claimed in claim 17 in which said interior wall extends to an end of said cap below said entry and has a groove therein from said end of said entry together with said stem defining a flow passage to said entry, said groove of said interior wall terminating at said entry.

19. In a valve stem for a pressurized container, adapted to mix and guide said material and to break up solids therein, said stem having a principal flow passage extending longitudinally therein from adjacent a base and toward a discharge end, that improvement comprising:
- a stepped entry at the end of said flow passage adjacent said base, said stepped entry defining a flow passage entry section whose cross-sectional dimensions increase in steps.

20. The improvement claimed in claim 19 in which said stepped entry is provided by a longitudinally extending wall segment, intermediate the exterior of said stem and an inner wall of said passage, and a pair of angularly inclined wall segments, one extending between said exterior and the base end of said longitudinally extending wall segment and the other extending between the other end of said longitudinally extending wall segment and said inner wall.

21. The improvement claimed in claim 20 further including a cap cooperating with said valve stem and having an auxiliary passage offset from and open to said entry of principal passage and extending from said entry toward said base.

22. The improvement claimed in claim 21 in which said auxiliary passage terminates in a right angle wall at said entry opposite said longitudinally extending wall segment when said cap is in position on said valve stem.

23. The improvement claimed in claim 21 in which said cap in position on said valve stem terminates at one end beyond said stepped entry of said flow passage toward said base end, said auxiliary passage extending to said one end of said cap.

24. The improvement claimed in claim 23 in which the end of said auxiliary passage opposite said one end of said cap terminates in a right angle wall that is opposite said longitudinally extending wall segment.

25. The improvement claimed in claim 24 in which said passages are grooves.

26. The improvement claimed in claim 25 in which said inclined wall segments are each inclined inwardly at 45° angles.

27. An integral self-biasing valve member of resilient resinous material for use in a pressurized container having an aperture in a wall thereof, comprising:
- a base for positioning in said container adjacent said aperture;
- a continuous valving surface on one side of and integral with said base, said valving surface having minimum dimensions greater than those of said aperture for sealing said aperture; and
- a plurality of thin, resilient, spaced apart legs on the other side of and integral with said base, said legs angularly extending away from said base;
- whereby, said legs are adapted for positioning against a fixed member for biasing said valving surface toward said aperture.

28. The valve member claimed in claim 27 in which said legs are disposed about an axis extending at right angles to the plane of said valving surface and the inner walls of said legs diverge from said plane.

29. The valve member claimed in claim 28 in which the outer walls of said legs extend vertically from said plane.

30. The valve member claimed in claim 29 in which said legs are symmetrically disposed about said axis.

31. The valve member claimed in claim 30 in combination with a housing therefor having a wall extending transversely below and in biasing contact with the ends of said legs.

32. In a pressurized container, an improved valve assembly, said valve assembly being self-biasing and adapted for mixing and break-up of solids in the dispensed product, comprising:
- an integral valve stem including a stem portion, extending on a longitudinal axis through an aperture in a wall of said container, and a base portion in said container, said base portion having a continuous valving surface in a plane adjacent said wall beyond the outer limit of said aperture and also having a plurality of thin, resilient, spaced apart legs angularly extending from said base on the opposite side thereof from said valving surface, said stem portion having a flow passage extending from adjacent said base to the end thereof, the entry of said passage adjacent said base being stepped, and said stem portion having a swirl chamber, connected with said flow passage, formed on a surface at said end, said surface normal to a discharge axis angularly disposed relative to the longitudinal axis of said stem portion;
- a cap on said stem having an inner wall flush with said surface and having a discharge aperture coaxial of said discharge axis; and
- a housing connected to said container therewithin and having a wall positioned adjacent and in biasing contact with the ends of said legs.

33. A valve assembly for a pressurized material dispensing container comprising:
- a valve housing for mounting in said container, said housing defining a valve chamber having an inlet port for communication with the interior of said container and an outlet port, a valve surface in said housing adjacent said outlet port;
- a valve member disposed in said valve housing, said valve member having a body portion, a valving surface on one side of said body portion for engaging said housing valve surface and sealing the outlet port of said housing, an elongated, axially extending stem located coaxially with respect to said valving surface and extending through said outlet port, said stem having a flow passage extending from adjacent said valving surface to an end wall surface of said stem, said end wall surface being disposed at an angle to a discharge axis of said valve assembly;

a cap disposed on said stem, said cap having an inner wall surface in cooperating engagement with said stem end surface and having a discharge aperture coaxial of said discharge axis, and break up chamber structure formed on at least one of said wall surfaces so that said wall surfaces in engagement with one another define a break up chamber interposed between said flow passage and said discharge aperture.

References Cited

UNITED STATES PATENTS

| | | | |
|---|---|---|---|
| 3,112,074 | 11/1963 | Green | 239—493 |
| 3,129,893 | 4/1964 | Green | 239—337 X |
| 3,209,960 | 10/1965 | Green | 239—337 X |
| 3,240,431 | 3/1966 | Hug et al. | 222—402.24 X |
| 3,416,737 | 12/1968 | Venus | 239—337 X |

EVERETT W. KIRBY, Primary Examiner

U.S. Cl. X.R.

239—337, 573, 579